United States Patent
Fan et al.

(10) Patent No.: US 12,055,759 B2
(45) Date of Patent: Aug. 6, 2024

(54) WAVELENGTH SELECTIVE SWITCH

(71) Applicants: O-Net Communications (USA) Inc., San Jose, CA (US); O-Net Technologies (Shenzhen) Group Co., Ltd, Shenzhen (CN)

(72) Inventors: Chenjun Fan, Kanata (CA); Wenlu Wang, Nepean (CA); Zuowen Jiang, Ottawa (CA)

(73) Assignees: O-NET TECHNOLOGIES (SHENZHEN) GROUP CO., LTD., Shenzhen (CN); O-NET COMMUNICATIONS (USA) INC., San Jose, CA (US)

( * ) Notice: Subject to any disclaimer, the term of this patent is extended or adjusted under 35 U.S.C. 154(b) by 0 days.

(21) Appl. No.: 18/262,161

(22) PCT Filed: Jan. 19, 2022

(86) PCT No.: PCT/US2022/013011
§ 371 (c)(1),
(2) Date: Jul. 19, 2023

(87) PCT Pub. No.: WO2022/159517
PCT Pub. Date: Jul. 28, 2022

(65) Prior Publication Data
US 2024/0036260 A1    Feb. 1, 2024

Related U.S. Application Data

(60) Provisional application No. 63/139,084, filed on Jan. 19, 2021.

(51) Int. Cl.
G02B 6/27    (2006.01)
G02B 6/293    (2006.01)
G02B 6/35    (2006.01)

(52) U.S. Cl.
CPC ......... *G02B 6/29302* (2013.01); *G02B 6/272* (2013.01); *G02B 6/274* (2013.01);
(Continued)

(58) Field of Classification Search
CPC .... G02B 6/272; G02B 6/274; G02B 6/29302; G02B 6/2931; G02B 6/29311; G02B 6/3518; G02B 6/3526
See application file for complete search history.

(56) References Cited

U.S. PATENT DOCUMENTS 7,212,703 B2    5/2007   Wu
7,787,720 B2    8/2010   Frisken et al.
(Continued)

FOREIGN PATENT DOCUMENTS

CN    104583824 A    4/2015
CN    104808293 A    7/2015
(Continued)

OTHER PUBLICATIONS

International Search Report and Written Opinion mailed Apr. 8, 2022 for International Patent Application No. PCT/US2022/013011.
(Continued)

*Primary Examiner* — Ryan A Lepisto
(74) *Attorney, Agent, or Firm* — Perkins Coie LLP

(57) ABSTRACT

This patent document discloses, among others, wavelength-selective switches (WSS) for redirecting optical WDM signals or channels based on a combination of spatially separating light in different optical polarizations in an optical birefringent material and using diffractive optics for separating light at different optical WDM wavelengths into spatially separated optical beam to perform wavelength-selective optical switching in optical WDM applications. Notably, the optics for processing the optical WDM signals in the disclosed optical WSS devices is designed to provide (Continued)

Wavelength-Selective Switch scalable optical WSS devices where different WDM signals share optical components to reduce designed optical components for different WDM signals.

20 Claims, 6 Drawing Sheets

(52) U.S. Cl.
CPC ........ *G02B 6/2931* (2013.01); *G02B 6/29311* (2013.01); *G02B 6/3512* (2013.01); *G02B 6/3518* (2013.01); *G02B 6/3526* (2013.01); *G02B 6/3546* (2013.01); *G02B 6/356* (2013.01)

(56) References Cited

U.S. PATENT DOCUMENTS

| | | | |
|---|---|---|---|
| 7,902,599 B2 | 3/2011 | Carter et al. | |
| 8,867,016 B2* | 10/2014 | Mao | G02B 6/2938 349/196 |
| 9,025,094 B2* | 5/2015 | Sakurai | G02B 6/35 349/196 |
| 9,341,870 B1* | 5/2016 | Wagener | G02B 5/3083 |
| 9,588,299 B2* | 3/2017 | Mao | G02B 6/356 |
| 9,654,848 B2* | 5/2017 | Frisken | G02B 6/3512 |
| 10,257,594 B2* | 4/2019 | Holmes | H04Q 11/0005 |
| 10,620,374 B2* | 4/2020 | Mao | G02B 27/285 |
| 2002/0071627 A1 | 6/2002 | Smith et al. | |
| 2009/0220192 A1 | 9/2009 | Presley et al. | |
| 2009/0220233 A1 | 9/2009 | Presley et al. | |
| 2013/0235283 A1 | 9/2013 | Mao et al. | |
| 2016/0282563 A1 | 9/2016 | Keyworth et al. | |
| 2017/0023741 A1* | 1/2017 | Iwama | G02B 6/3512 |
| 2017/0214482 A1 | 7/2017 | Frisken | |
| 2018/0128984 A1 | 5/2018 | Yan et al. | |

FOREIGN PATENT DOCUMENTS

| | | |
|---|---|---|
| CN | 106772820 A | 5/2017 |
| CN | 109791257 A | 5/2019 |

OTHER PUBLICATIONS

Extended European Search Report mailed Mar. 28, 2024 in European Patent Application No. 22743124.4, 8 pages.
Office Action mailed Jan. 26, 2024 for Chinese Patent Application No. 202280022806.3.

* cited by examiner

Wavelength-Selective Switch

Wavelength-Selective Switch

Wavelength-Selective Switch

Wavelength-Selective Switch

Wavelength-Selective Switch

Example: Construction of Wavelength-Selective Switch

WAVELENGTH SELECTIVE SWITCH

PRIORITY CLAIM AND RELATED PATENT APPLICATION

This patent document is a 371 National Phase of International Patent Application No. PCT/US2022/013011, filed Jan. 19, 2022, which claims the priority and benefits of U.S. Provisional Patent Application No. 63/139,084 entitled "WAVELENGTH SELECTIVE SWITCH" and filed on Jan. 19, 2021. The entire contents of the above applications are incorporated by reference as part of the disclosure of this patent document.

TECHNICAL FIELD

This patent document relates to optical switching in optical fiber networks and other optical devices or systems.

BACKGROUND

An optical switch is a device that redirects an optical beam. In optical devices, modules or systems based on optical wavelength-division multiplexing (WDM), optical beams or signal channels at different optical wavelengths need to be redirected by optical switches that are wavelength selective so that optical WDM signals or channels at different optical WDM wavelengths can be redirected to desired directions or locations. In optical WDM fiber networks, for example, such wavelength-selective optical switching is used in ROADM (Reconfigurable optical add-drop multiplexer) and optical cross-connect switches to perform important optical networking operations.

SUMMARY

This patent document discloses, among others, wavelength-selective switches (WSS) for redirecting optical WDM signals or channels based on a combination of spatially separating light in different optical polarizations in an optical birefringent material and spatially separating light in different wavelengths in diffractive optics to perform wavelength-selective optical switching in optical network applications. Notably, the optics for processing the optical WDM signals in the disclosed optical WSS devices is designed to provide scalable optical WSS devices where different WDM signals share optical components and package.

In one embodiment, the disclosed technology can be implemented to provide, for example, a wavelength selective optical switch which includes a linear array of optical fibers spaced from each other along a first direction to form a first plane which has a normal direction in a second direction that is perpendicular to the first direction; an optical birefringent material positioned to receive output light from fiber terminal ports of the linear array of optical fibers and configured to spatially separate light output from each optical fiber into two spatially separated optical beams in two linear orthogonal optical polarizations to define a second plane which has a normal direction that is parallel to the first direction; and a collimating lens located away from the optical birefringent material to receive the spatially divergent optical beams in linear orthogonal optical polarizations from each optical fiber of the linear array of optical fibers and spaced from fiber terminal ports of the linear array of optical fibers by a focal length of the collimating lens to transform the two spatially divergent optical beams in the two linear orthogonal optical polarizations from each optical fiber into two spatially separated and parallel optical beams in the two orthogonal optical polarizations, respectively. An optical polarization rotator is positioned and structured to receive optical beams from the linear array of optical fibers in only one optical polarization of the two linear orthogonal optical polarizations to rotate the polarization of the received optical beams from the linear array of optical fibers in only one optical polarization to be parallel to the other optical polarization of the two linear orthogonal optical polarizations so that two spatially separated and parallel optical beams from each optical fiber are in the same linear polarization, and an optical grating is positioned downstream from the optical polarization rotator and the collimating lens to receive the two spatially separated and parallel optical beams in the same linear polarization from each optical fiber of the linear array of optical fibers and to diffract each optical beam into different diffracted output beams at different optical wavelengths in different diffracted beam directions, respectively. This optical switch further includes an array of optical deflectors positioned relative to the optical grating to receive the different diffracted output beams at different optical wavelengths in different diffracted beam directions from each optical fiber of the linear array of optical fibers, respectively, and redirect the received different diffracted output beams at different optical wavelengths in different diffracted beam directions from each optical fiber of the linear array of optical fibers back to the optical grating, the optical polarization rotator, the collimating lens, the optical birefringent material and the fiber terminal ports of the linear array of optical fibers; and a control device coupled to the array of optical deflectors to apply deflector control signals to the optical deflectors, respectively, so that each optical deflector is responsive to a corresponding applied control signal to direct a diffracted output beam from the optical grating in a desired direction back to the optical grating based on the corresponding applied control signal, wherein the deflector control signals are generated to effectuate desired wavelength-selective optical switching in the linear array of optical fibers.

In some implantations, the above example of a wavelength selective optical switch may further include the following lenses: a first cylindrical lens is located between the optical grating and the array of optical deflectors and spaced by a focal length of the first cylindrical lens from each of the optical grating and the array of optical deflectors. The first cylindrical lens is positioned to process and transmit light associated with the optical beams that transmit through the optical polarization rotator. A second cylindrical lens is located between the optical grating and the array of optical deflectors and spaced by a focal length of the second cylindrical lens from each of the optical grating and array of optical deflectors. The second cylindrical lens is positioned to process and transmit light associated with other optical beams that do not transmit through the optical polarization rotator, wherein each of the first and second cylindrical lenses is oriented to provide optical power for bending light in the second plane while exhibiting no optical power in the first plane. Third and fourth cylindrical lenses are located between the optical grating and the array of optical deflectors, and each of the third and fourth cylindrical lenses is oriented to provide optical power for bending light in the first plane while exhibiting no optical power in the second plane. The third cylindrical lens is located closer to the optical grating and spaced by a focal length of the third cylindrical lens from the optical grating, and the fourth cylindrical lens is located closer to the array of optical deflectors and spaced by a focal length of the fourth cylindrical lens from the array of optical deflectors. The third and fourth cylindrical lenses are spaced from each other by a distance equal to a sum of focal lengths of the third and fourth cylindrical lenses so that the third and fourth cylindrical lenses form a telecentric lens system between the optical grating and the array of optical deflectors.

In another embodiment, the disclosed technology can be implemented to provide a wavelength selective optical switch to include a linear array of optical fibers spaced from each other along a first direction to form a first plane which has a normal direction in a second direction that is perpendicular to the first direction; an optical birefringent material positioned to receive output light from fiber terminal ports of the linear array of optical fibers and configured to spatially separate light output from each optical fiber into two spatially separated optical beams in two linear orthogonal optical polarizations to define a second plane which has a normal direction that is parallel to the first direction; a collimating lens located away from the optical birefringent material to receive the spatially divergent optical beams in orthogonal optical polarizations from each optical fiber of the linear array of optical fibers and spaced from fiber terminal ports of the linear array of optical fibers by a focal length of the collimating lens to transform the two spatially divergent optical beams in the two linear orthogonal optical polarizations from each optical fiber into two spatially separated and parallel optical beams in the two linear orthogonal optical polarizations, respectively; and an optical polarization rotator positioned and structured to receive optical beams from the linear array of optical fibers in only one optical polarization of the two linear orthogonal optical polarizations to rotate the polarization of the received optical beams from the linear array of optical fibers in only one optical polarization to be parallel to the other optical polarization of the two linear orthogonal optical polarizations so that two spatially separated and parallel optical beams from each optical fiber are in the same polarization. This device further includes an optical grating positioned downstream from the optical polarization rotator and the collimating lens to receive the two spatially separated and parallel optical beams in the same polarization from each optical fiber of the linear array of optical fibers and to diffract each optical beam into different diffracted beams at different optical wavelengths in different diffracted beam directions, respectively. The optical grating is a reflective optical grating and directs the different diffracted beams at different optical wavelengths in different diffracted beam directions on the same side of the optical grating. An array of optical deflectors is positioned in optical paths of the different diffracted beams at the different optical wavelengths in the different diffracted beam directions from the optical grating to reflect the different diffracted beams back towards the optical grating so as to redirect the received different diffracted beams from the optical grating towards the collimating lens, the optical birefringent material and the fiber terminal ports of the linear array of optical fibers. This device further includes a control device coupled to the array of optical deflectors to apply deflector control signals to the optical deflectors, respectively, so that each optical deflector is responsive to a corresponding applied control signal to direct a diffracted beam from the optical grating in a desired direction towards the collimating lens, the optical birefringent material and the fiber terminal ports of the linear array of optical fibers for optical switching based on the corresponding applied control signal, wherein the deflector control signals are generated to effectuate desired wavelength-selective optical switching in the linear array of optical fibers. In some implementations of this embodiment, the device may include additional linear arrays of optical fibers stacked over the linear array of optical fibers in the second direction that is perpendicular to the first direction to direct light to pass through the optical birefringent material, the collimating lens, the optical polarization rotator, and the optical grating; and additional arrays of optical deflectors positioned to receive and reflect light from the additional liner arrays of optical fibers back towards the optical grating to perform desired optical switching.

Various applications of the features can be made, including stacking two or more linear fiber arrays sharing the same optics and package in the disclosed optical WSS devices to form scalable optical WSS switches in optical fiber networks and other systems.

The above features and other features of the disclosed technology are described in greater detail in the drawings, the description and the claims.

1, 2 and 3—three optical axes of three separate lens systems;
4—Fiber array;
5—Wollaston prism;
6—Optical path compensator;
7—Polarization rotator (Half waveplate);
8—Collimating/Focusing lens (can be spherical mirror);
9—Dispersion grating (can be reflective);
10 & 13—cylindrical lenses (telecentric);
11 & 12—Cylindrical Fourier lenses; and
14—LCoS spatial light modulator or MEMS array.

Figure 1:
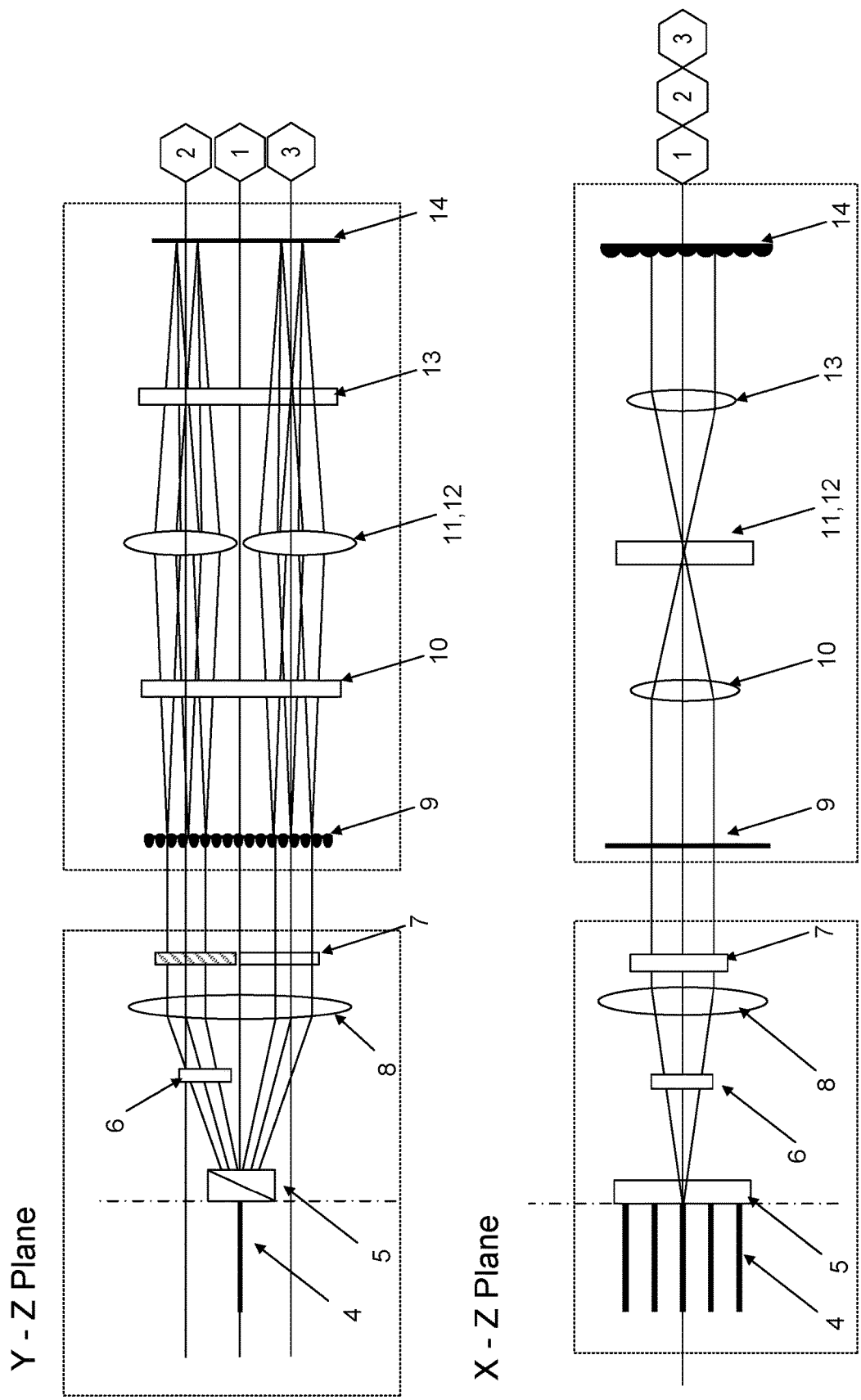
FIGS. 1-6 are examples in which numerals are used to represent various parts.

FIG. 1 shows an example of one implementation of an optical wavelength selective switch (WSS).

Figure 2:
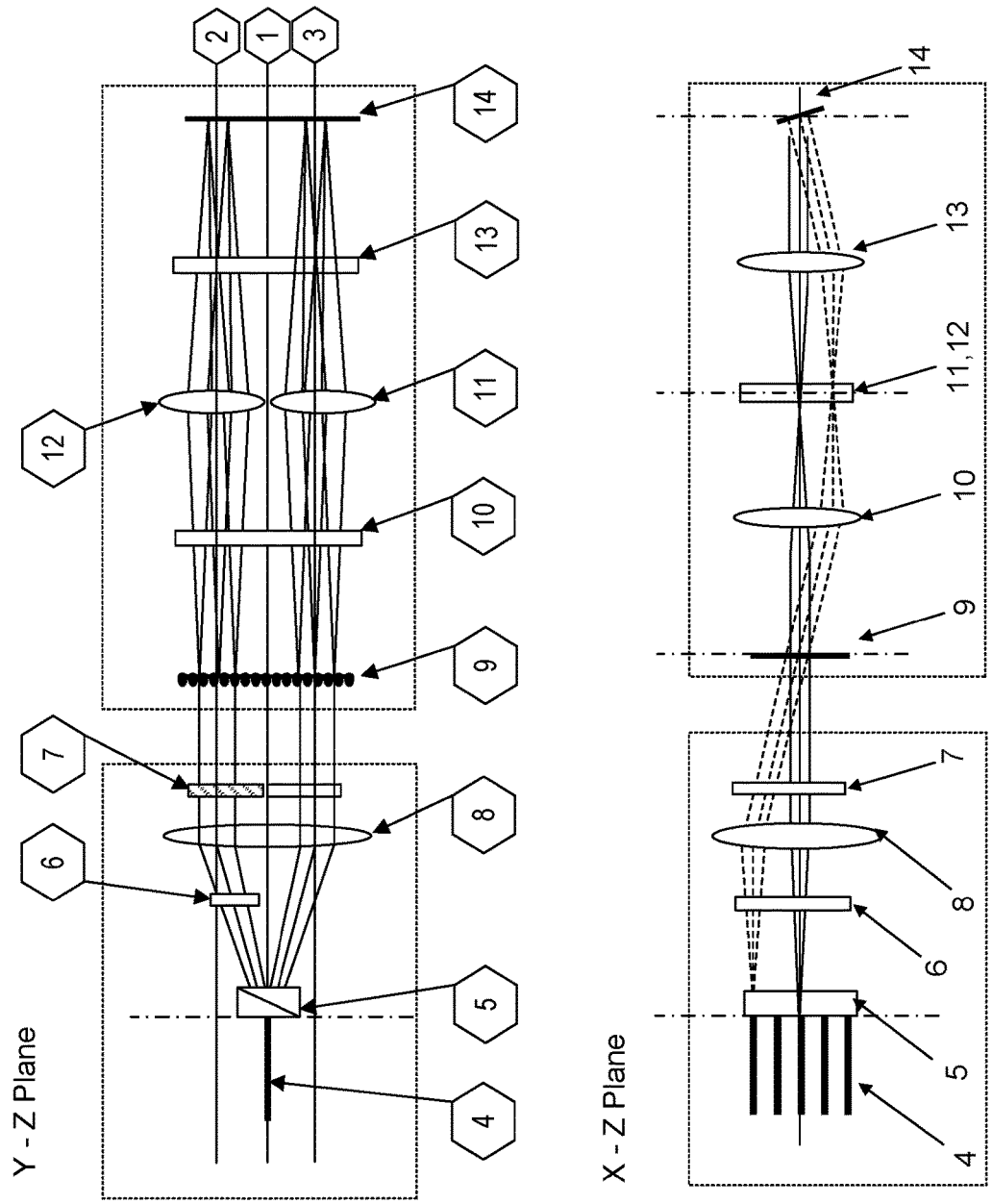

FIG. 2 shows details of various optical components in an example of an optical WSS device as shown in FIG. 1.

Figure 3:
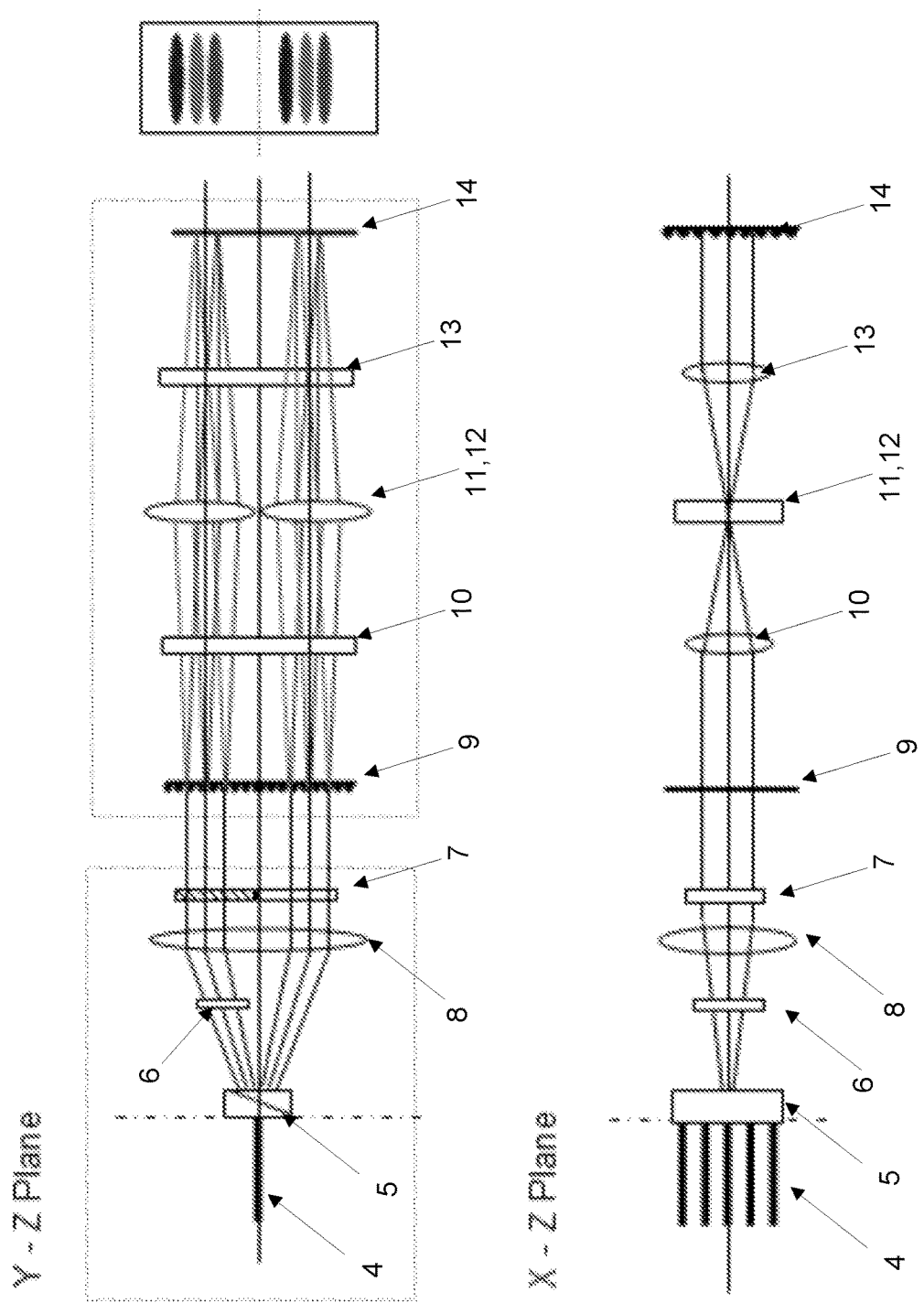

FIG. 3 further shows the WSS device in FIGS. 1 and 2 by using a top drawing to show the hardware components in the Y-Z plane by processing and switching optical channels separated into two parallel optical paths in two linear orthogonal polarizations that are processed in parallel.

Figure 4:
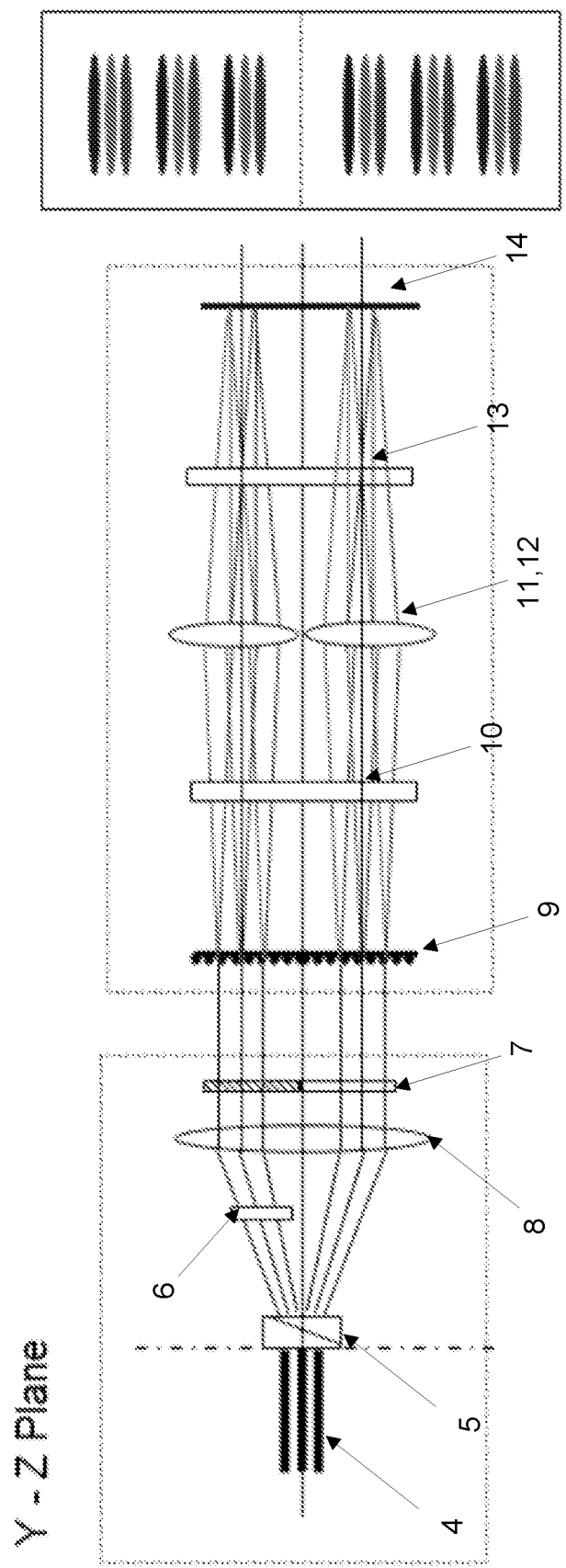

FIG. 4 shows an example of an Mx(1×N) WSS device by replacing the single fiber array in the X-Z plane in FIG. 1 with two or more fiber arrays that are stacked over one another along the Y direction in the X-Z plane.

Figure 5:
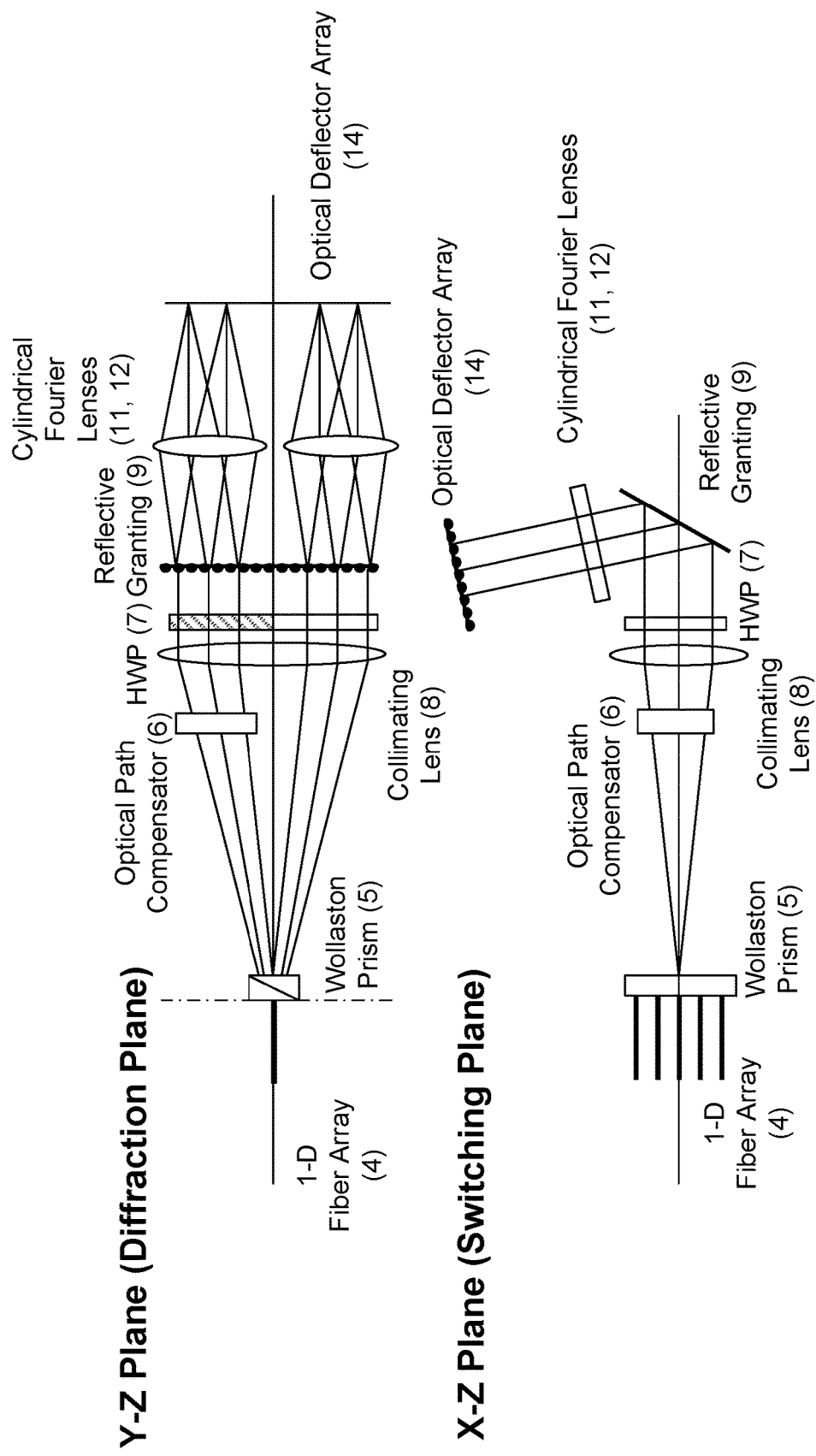

FIG. 5 below further shows an example of an optical WSS device using a reflective optical grating in both the X-Z plane and the Y-Z plane where a 1-D fiber array is placed in the switching plane, the X-Z plane.

Figure 6:
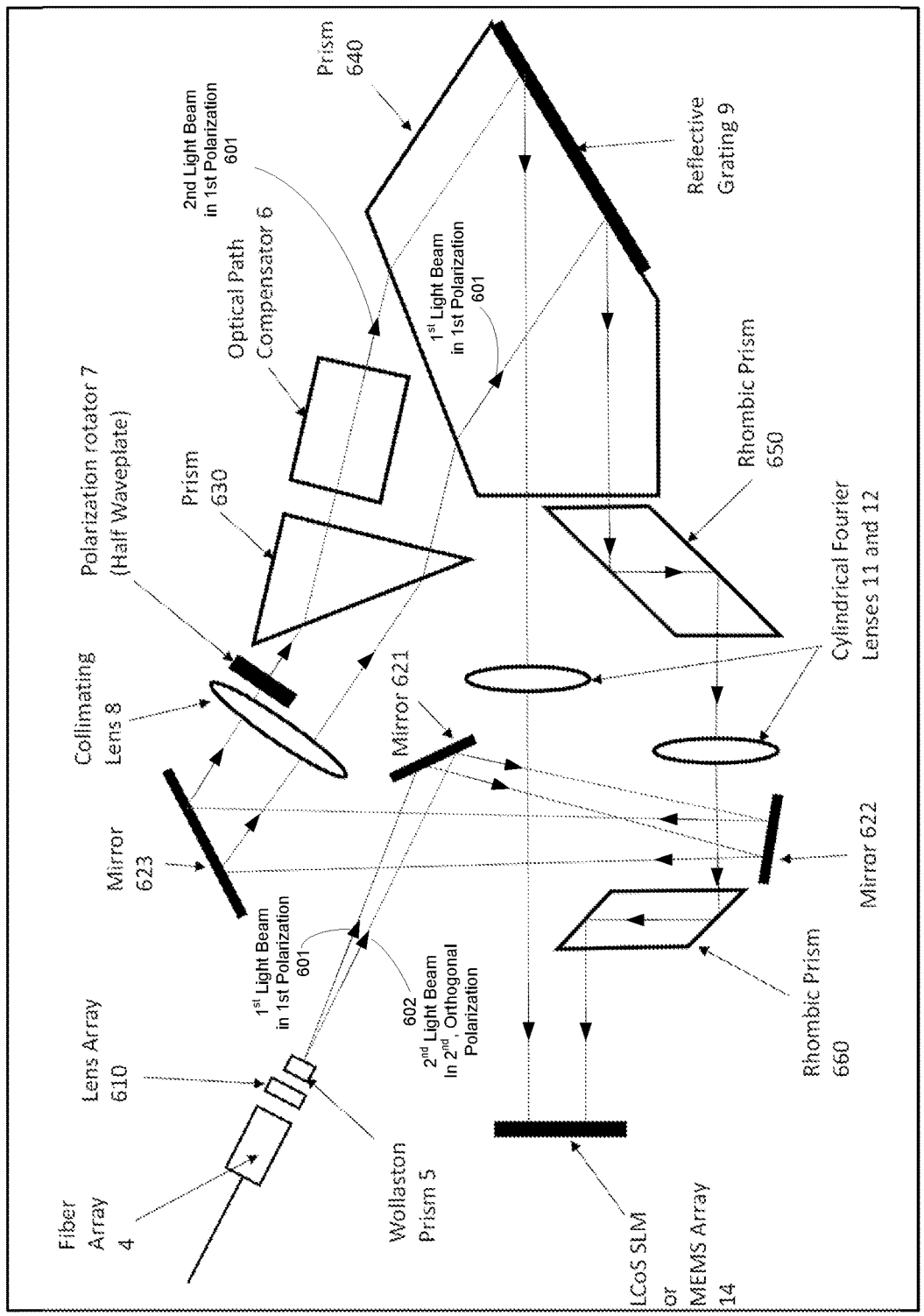

FIG. 6 shows a device implementation example of a wavelength selective switch to implement the optical train in FIG. 5.

DETAILED DESCRIPTION

Wavelength selective switch (WSS) devices are useful in wide range of applications. The structures of various wavelength-selective switch (WSS) devices in optical fiber networks tend to be complex and expensive; and it can be difficult to scale up such optical WSS devices as the number of optical WDM channels increases. Certain wavelength selective switch (WSS) devices deployed in optical networks, however, may have been limited to the network core mainly because of their relatively high costs and poor scalability.

There is a need to have a lower cost solution with improved scalability, so that WSS can be used not only in the core networks, but also widely in the metro networks, access networks and data centers. The designs of optical WSS devices disclosed in this patent document combine technical features in sharing of optical components for processing different optical beams, use of optical polarization diversity and unique designs of optical lens systems to provide a scalable and hi-performance optical WSS platform.

FIG. 1 shows an example of one implementation of an optical WSS switch and includes two figures in two perspective views in the Y-Z plane and X-Z plane, respectively. An array of optical fibers (4) in this example is a 1-dimensional linear array of optical fibers in the first direction labeled as the X direction and the optical axis of the optical switch is along the Z direction. The Y direction is the direction perpendicular to the X and Z directions. The X-Z plane formed by the optical fibers (4) is parallel to the fibers (in a normal direction parallel to the Y direction) and constitutes the switching plane in which certain beams are redirected to perform the optical switching. To accommodate for a high channel count, a small fiber spacing (e.g., 127 microns or less) may be used in the fiber array.

As shown by the dashed line in FIG. 1, the output fiber ports of the optical fibers are aligned with one another at the dashed line. Each optical fiber carries its own light which can be a single optical channel at a particular optical WDM wavelength or a combination of two or more different optical channels at different optical WDM wavelengths. An optical birefringent material (5) is provided to receive output light from fiber ports of the linear array of optical fibers (4) and configured to spatially separate light output from each optical fiber into two spatially separated optical beams in two linear orthogonal optical polarizations in the Y-Z plane. This optical birefringent material (5) may be implemented in different ways. For example, a Wollaston prism formed by two pieces of birefringent crystal materials with their crystal optic axes arranged to be perpendicular to each other may be used to separate the light in P and S polarizations as two separate beams as marked by black and blue rays in the figure in the Y-Z plane. As shown in the upper figure in FIG. 1, light in one linear polarization output by the birefringent material (5) is directed to the upper half above the optical axis (z-direction) and light in another orthogonal linear polarization is directed to the lower half below the optical axis. The two divergent beams in the two orthogonal polarizations are generally spherical beams or Gaussian beams with the centers substantially close to the optical axis separated by a certain distance because of the optical path difference. This Wollaston prism can be a very thin piece which may be directly attached to the fiber ports.

Next in the optical train for the optical WSS device, a collimating lens (8) is provided to receive, from the Wollaston prism (5), spatially divergent optical beams in orthogonal P and S optical polarizations from each optical fiber of the linear array of optical fibers (4) in the Y-Z plane. This collimating lens (8) is spaced from fiber terminal ports of the linear array of optical fibers (4) by a focal length of the collimating lens (8) to transform the two spatially divergent optical beams in the two orthogonal P and S optical polarizations from each optical fiber into two spatially separated and parallel optical beams that still remain in the two P and S orthogonal optical polarizations. The collimating lens (8) can be rotationally symmetric to provide optical power and collimation in all directions including both the Y-Z and X-Z planes as shown. For example, various lenses such as a spherical, aspherical or a group of lenses lens can be used for implementing this lens.

The two spatially separated and parallel optical beams in P and S orthogonal optical polarizations are next processed by an optical polarization rotator (7) downstream from the collimating lens (8) to rotate the polarization of one of the two parallel beams in P and S orthogonal optical polarizations by 90 degrees while leave the polarization of the other one of the two parallel beams unchanged so that the two beams will be in the same polarization after this transformation by the optical polarization rotator (7). An optical half wave plate formed of a birefringent crystal material or other devices may be used to implement the optical polarization rotator. This polarization rotation allows both beams to be in the same linear polarization perpendicular to the grooves of a downstream optical grating (9) to ensure efficient operation of the optical grating (9) which tends to be sensitive to optical polarization in the grating operation. In FIG. 1, the grooves of the grating (9) are parallel to the X direction and are spaced from one another in the Y direction so that the dispersion or diffraction is in the Y-Z plane as illustrated in FIG. 1. In other implementations, the optical polarization rotator may be placed between the collimating lens and the Wollaston prism.

FIG. 2 below further shows details of various optical components in this example of an optical WSS device in FIG. 1.

In the Y-Z plane, due to the different optical paths of the two optical beams in different polarizations from the Wollaston prism (5) to the collimating lens (8), at least one optical path compensator (6) may be provided in one of the two optical beams to equalize the optical path lengths of the different beams. Such an optical path compensator (6) may include a glass plate or a glass wedge to correct the beam center walk-off between both s polarization beam and p polarization beam resulting from birefringence of the Wollaston prism (5). The compensator (6) may be placed either in the upper half or lower half depending on the material of the Wollaston prism (5). The compensator (6) may be placed either before the collimating lens (8) or after the collimating lens (8). If the Wollaston prism (5) is a very thin piece and the effect to the optical path difference is sufficiently small or negligible, this optical path compensator (6) may be eliminated. The optical path compensator (6) can be replaced with a beam walk-off crystal which changes a beam path based on the optical polarization or optical frequency of the beam. In one implementation, for example, instead of being in either the S or P polarization beams and having an impact on either the S or P polarization like a glass compensator, this walk-off crystal can be designed to be across the S and P polarization beams and has an impact on both the S and P polarizations at the same time to have better optical path compensation and aberration correction.

In this example, the optical grating (9) is positioned downstream from the optical polarization rotator (7) and the collimating lens (8) to receive the two spatially separated and parallel optical beams in the same polarization from each optical fiber of the linear array of optical fibers (4). The optical grating (9) operates to diffract different spectral components contained within each optical beam into different diffracted output beams at different optical wavelengths in different diffracted beam directions, respectively. As explained above, the light from each fiber may include light at different optical WDM wavelengths and FIG. 2 illustrates this by showing red and green spectral components separated by the optical grating (9).

As shown in FIG. 2, an array of optical deflectors (14) is provided to change the beam directions of the different diffracted output beams at different optical wavelengths in different diffracted beam directions produced by the optical grating (9) in the X-Z plane to cause the optical switching operations so that certain optical channels received from the fibers can be switched to other fibers as a result of the optical switching operation. A control module is coupled to the array of optical deflectors (14) to apply control signals to the individual deflectors to effectuate the desired optical switching. The array of optical deflectors (14) can be a 1-dimensional array of micro-electro-mechanical systems (MEMS) mirrors, or a 2-dimensional array of liquid crystal on silicon (LCoS) cells or other controllable devices for changing the direction of the light. Under the control of the applied control signals to the individual deflectors, the deflectors (14) redirect the received different diffracted output beams at different optical wavelengths in different diffracted beam directions from each optical fiber of the linear array of optical fibers back to the optical grating (9), the optical polarization rotator (7), the collimating lens (8), the Wollaston prism (5) and the fiber terminal ports of the linear array of optical fibers (4).

The optical WSS device in FIGS. 1 and 2 operates by re-directing optical beams and thus switching optical beams from fiber to fiber in the X-Z plane which is also referred to as the "switching plane" in this document. The bottom figure in FIG. 2 in the X-Z plane illustrates that one of the optical deflectors or reflectors (14) is controlled to re-direct the light between two fibers in the fiber array: the top fiber shown in the X-Z plane of the 1-D fiber array and the middle fiber shown in the X-Z plane of the 1-D fiber array.

In the example of using an LCoS spatial light modulator array in the above optical WSS device, the LCoS cells are used to generate desired phase modulation in the X-direction so light beams of different wavelengths get reflected at different angles in the X-Z plane for optical switching operations. The reflected beams of different wavelengths are directed back and are focused on desired and different fiber ports as output. This is illustrated in the lower figure in FIG. 2. In some implementations, a portion of or entire portion of each wavelength and its two polarizations can be individually manipulated to be coupled into different fiber ports (having a deflection angle corresponding to a specific fiber port).

Referring to the example in FIGS. 1 and 2, in addition to the common collimating lens (8) for all optical beams from the fibers, two additional lens systems are provided as part of the optical WSS device. The first lens system is formed by a first cylindrical lens (11) and a second cylindrical lens (12) for the upper and lower beam paths in the Y-Z plane. In this specific example, the first cylindrical lens (11) is located between the optical grating (9) and the array of optical deflectors (14) and spaced by a focal length of the first cylindrical lens (11) from each of the optical grating (9) and the array of optical deflectors (14). The first cylindrical lens (11) is positioned to process and transmit light associated with the optical beams that transmit through the optical polarization rotator (7).

Similarly, the second cylindrical lens (12) is located between the optical grating (9) and the array of optical deflectors (14) and spaced by a focal length of the second cylindrical lens (12) from each of the optical grating (9) and the array of optical deflectors (14). The second cylindrical lens (12) is positioned to process and transmit light associated with other optical beams that do not transmit through the optical polarization rotator (7). Notably, due to this particular design, each of the first and second cylindrical lenses (11, 12) is oriented to provide optical power for bending light in the second plane shown as the Y-Z plane while exhibiting no optical power for bending or refracting light in the first plane shown as the X-Z plane. The lenses 11 and 12 are Fourier lenses because the light distribution on the deflector (14) is the Fourier transform of the light distribution on the grating (9) in the Y-Z plane.

Therefore, the example of an optical WSS device illustrated in FIGS. 1 and 2 has 3 lens systems that have three different optical axes that are labeled as "1", "2" and "3" in the drawing. First, after passing through the Wollaston prism (5), the optical beams in the two linear orthogonal polarizations are spatially separated in two different diverging optical paths in the Y-Z plane and are directed into the collimating lens (8) which transforms the two beams in the two optical polarizations into two spatially separated but parallel upper and lower optical beams in the Y-Z plane. The optical axis of this collimating lens (8) is the first optical axis (1) of the three optical axes. This first lens system is shown by components in the left hand side box. Second, the upper optical beam is directed to a cylindrical Fourier lens (12) which has an optical axis as the second optical axis (2). Third, the lower optical beam is directed to another cylindrical Fourier lens (11) which has an optical axis as the third optical axis (3). The second and third lens systems are shown in the right hand side box.

The lens system formed by the two cylindrical Fourier lenses (11, 12) enables the diffracted beams at different optical wavelengths produced by the optical grating (9) to be tightly focused in the Y-Z plane onto corresponding optical deflectors (14) for proper optical switching.

Referring to the lower figure in FIG. 1, the optical WSS device provides another lens system formed by third and fourth cylindrical lenses (10, 13) that are located between the optical grating (9) and the array of optical deflectors (14) as a telecentric lens system. Each of the third and fourth cylindrical lenses (10, 13) is oriented to provide optical power for bending or refracting light in the first plane (the X-Z plane) while exhibiting no optical power in the second plane (the Y-Z plane). The third cylindrical lens (10) is located closer to the optical grating (9) and spaced by a focal length of the third cylindrical lens (10) from the optical grating (9), and the fourth cylindrical lens (13) is located closer to the array of optical deflectors (14) and spaced by a focal length of the fourth cylindrical lens (13) from the array of optical deflectors (14). The third and fourth cylindrical lenses (10, 13) are spaced from each other by a distance equal to a sum of focal lengths of the third and fourth cylindrical lenses (10, 13) so that the third and fourth cylindrical lenses (10, 13) form a telecentric lens system between the optical grating and the array of optical deflectors. This telecentric lens system is used to ensure the desired angular alignment and lateral alignment of the beams in optical switching and to enable matching of beam waist.

The above disclosed WSS designs can be implemented to provide various technical features in optical switching. For example, a 1×N WSS device may be constructed. FIG. 3 below shows one example of a 1×N WSS device based on the disclosed technology using the hardware components and layout in FIG. 2.

FIG. 3 further shows the WSS device in FIGS. 1 and 2 by using a top drawing to show the hardware components in the Y-Z plane by processing and switching optical channels separated into two parallel optical paths in two linear orthogonal polarizations that are processed in parallel. The bottom drawing in FIG. 3 shows the hardware components in the X-Z plane and the routing of the light from one fiber in the fiber array to another fiber due to the deflection by the deflector array (e.g., an LCoS array or MEMS array) in the X-Z plane.

The WSS device in FIG. 3 is an example of a 1×N WSS device where the optical system images each wavelength channel into an elongated band on the deflector array and multiple elongated bands of the light of different wavelength channels from the fiber array are directed onto the deflector array and one of the N fibers is used to provide the input with all the channels to be switched, and the remaining (N−1) fibers as output fibers so that the deflector array can be controlled to provide the desired optical switching.

In some implementations, the fiber array in FIG. 3 may have a constant spacing between its fiber ports. In other implementations, the fiber array in FIG. 3 may be designed to have different spacings between its fiber ports: the unevenly spaced fibers in the fiber array may be used for reducing undesired optical crosstalk between different channels during switching.

The 1×N WSS device in FIG. 3 can be expanded into an M×(1×N) WSS device by replacing the single fiber array in the X-Z plane with two or more fiber arrays that are stacked over one another along the Y direction in the X-Z plane as shown in FIG. 4 below.

In the example in FIG. 4, M fiber arrays with each fiber array having N fibers, are stacked along the Y direction and all M×N fibers share the same set of optics. Due to the spatial separation of the M fiber arrays in the Y direction, light beams from the differently positioned fiber arrays have different incident angles on the grating (9) and are directed to different locations or zones in the Y direction at the deflector array as shown in FIG. 4. Within each zone corresponding to each fiber array, different wavelength channels are further spatially separated into different bands in the same way as the 1×N WSS implementation shown in FIG. 3. M different 1D fiber arrays are stacked along the Y direction and the switching occurs within each Y-Z plane.

FIG. 5 further shows an example of an optical WSS device using a reflective optical grating in both the X-Z plane (the switching plane, in the lower figure) and the Y-Z plane (in the upper figure) where a 1-D fiber array is placed in the switching plane, the X-Z plane.

In this example in FIG. 5, a 1-D fiber array (4) is on the front focal plane of the collimating/focusing lens (8) and a Wollaston prism (5) is placed at the fiber ports of the fibers (4) to spatially separate the light from the fibers into two spatially divergent beams in two linear orthogonal polarizations. The collimating/focusing lens (8) transforms the two beams in the two linear orthogonal polarizations into parallel beams in the upper and lower parts of the Y-Z plane. A half wave plate HWP (7) is placed in one of the two beams in the Y-Z plane to rotate the polarization of that beam by 90 degrees so that the two parallel beams in the Y-Z plane are in the same polarization when incident to a reflective optical grating (9) located downstream from the collimating lens (8) and the HWP (7). In some implementations, this common polarization of the two beams is controlled to be the polarization to achieve a high diffraction efficiency at the reflective optical grating (9). An optical deflector array (14) is placed in the optical path of the diffracted beams produced by the reflective optical grating (9) so the light from the collimating lens (8) is first diffracted and reflected by the reflective optical grating (9) into spatially separate beams of different spectral components as shown in the upper figure in the Y-Z plane in FIG. 5. The spatially separate beams of different spectral components are reflected by the reflective optical grating (9) towards the optical deflector array (14) which reflects the light from the reflective optical grating (9) back to the reflective optical grating (9). Fiber ports of the fiber array (4) are placed on the front focal plane of the collimating lens (8) and the optical deflector array (14) is on the back focal plane of the collimating lens (8). The optical deflectors defectors in the optical deflector array (14) are controlled by the optical WSS control module so that different optical deflectors are individually controlled to reflect the light to the reflective optical grating (9) in desired directions towards the collimating lens (8), the Wollaston prism (5) and back to the 1-D fiber array (4) to achieve desired optical switching operations.

As illustrated by the upper diagram showing the device in the Y-Z plane (diffraction plane) in FIG. 5, the optical deflector array (14) may be implemented as an array of LCoS spatial light modulators (SLMs) or MEMS elements located on the back focal plane of the first and second cylindrical Fourier lenses (11, 12) while the reflective optical grating (9) is on the front focal planes of the first and second cylindrical Fourier lenses (11, 12). The LCoS SLMs can be configured to perform their phase modulation in the X-direction so light beams of different wavelengths get reflected with different angles in the X-Z plane. The reflected beams of different wavelengths go all the way back and get focused into different output fibers. Different from the device designs in FIGS. 1-4, the optical train in FIG. 5 is simplified by eliminating the telecentric lens system formed by two lenses.

In devices where stacked fiber arrays are used, scalability may be impacted by the Wollaston prism. In general, it is desirable to keep the stacked fiber arrays tightly spaced. To have large enough incident angles on the grating while keeping the spacings between the rows small, a pair of lenses in telecentric telescope configuration can be used in front of the grating to increase the incident angles on the grating (the beam size reduced at the same time). In some designs, an anamorphic prism can be further used to adjust the beam size in order to have better diffraction effect. In some implementations, each LCoS spatial light modulators (SLM) may generate first order and higher order diffraction beams and the optical switching is designed to switch the first diffraction order beam. It may be desirable to manage the optical power in other orders to reduce undesired optical crosstalk. In this regard, uneven/irregular spacing may be used between fibers in a row of fiber array to reduce or eliminate undesired coupling of light in high diffraction orders into adjacent fiber ports (crosstalk reduction).

The above examples describe a novel launch optics based on optical polarization to generate two parallel beams with polarization diversity for downstream optical switching operations and provide, in combination with sharing of optical components, scalability of the disclosed WSS devices with high port count WSS. In some implementations, the disclosed WSS designs can be used to construct arrays of WSS for an N×M wavelength selective cross connect matrix switch using single LCoS engine.

FIG. 6 shows an example of a specific implementation of a wavelength selective switch using a reflective grating for implementing the grating (9) in FIG. 5. This device implementation example features a folded optical train design to achieve a small or compact overall footprint of the device by combining the reflective grating (9) with three mirrors (621, 622 and 623), and prism (640) on the optical input arm of the reflective grating (9). Rhombic prism (650) and rhombic prism (660) are provided in this implementation to separate the diffracted beams of the two polarizations on the optical output arm of the reflective grating (9). A lens array (610) of different lenses is placed between the fiber array (4) with multiple fiber lines and the Wollaston prism (5) where each lens in the lens array (610) corresponds to a particular fiber line in the fiber array (4) so that there is a 1-to-1 correspondence between the fiber lines and the lenses. In some implementations, the image of the output facets of the fibers can be imaged inside the Wollaston prism (5). The output light from each fiber line is received and imaged to a different beam size by its corresponding lens after the lens array (610). The use of the lens array (610) can control the size of each beam from the fiber line when travelling through the optical train of the device to and from the reflective grating (9). Prism (640) and reflective grating (9) form a grating-prism combination Grism which can deliver substantially larger dispersion and separate the output arm from the input arm of the reflective grating (9) substantially in the same time. In this specific example, prism (630) is added between the collimating lens (8) and the reflective grating (9) to further control the beam size on the input arm of the reflective grating (9). In the placement of the prism (630) as shown, the two beams in the same polarization incident to the front surface of the prism (630) are oriented at or near the Brewster angle so that the two beams at the same polarization transmit through the front surface with no or minimized optical reflection. Similarly, the two light beams in the same polarization incident on the input surface of prism (640) are substantially close to the Brewster angle to maximize the optical transmission and to reduce undesired optical reflection. In addition to optical path compensator (6) placed in the second light beam, rhombic prism (650) and rhombic prism (660) are placed in the optical path of the first light beam to equalize the corresponding optical paths of the two lights beams that initially split by the Wollaston prism (5). Similar to the optical design in FIG. 5, the LCoS SLM or MEMS array (14) and the reflective grating (9) are on the front and back focal planes of the lenses 11 and 12, respectively.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A wavelength selective optical switch, comprising:
a linear array of optical fibers spaced from each other along a first direction to form a first plane which has a normal direction in a second direction that is perpendicular to the first direction;
an optical birefringent material positioned to receive output light from fiber terminal ports of the linear array of optical fibers and configured to spatially separate light output from each optical fiber into two spatially separated optical beams in two orthogonal optical polarizations to define a second plane which has a normal direction that is parallel to the first direction;
a collimating lens located away from the optical birefringent material to receive the spatially divergent or separated optical beams in orthogonal optical polarizations from each optical fiber of the linear array of optical fibers and spaced from the fiber terminal ports of the linear array of optical fibers by a focal length of the collimating lens to transform the two spatially divergent or separated optical beams in the two orthogonal optical polarizations from each optical fiber into two spatially separated and parallel optical beams in the two orthogonal optical polarizations, respectively;
an optical polarization rotator positioned and structured to receive optical beams from the linear array of optical fibers in only one optical polarization of the two orthogonal optical polarizations to rotate the polarization of the received optical beams from the linear array of optical fibers in the only one optical polarization to be parallel to the other optical polarization of the two orthogonal optical polarizations so that two spatially separated and parallel optical beams from each optical fiber are in a same polarization;
an optical grating positioned downstream from the optical polarization rotator and the collimating lens to receive the two spatially separated and parallel optical beams in the same polarization from each optical fiber of the linear array of optical fibers and to diffract each optical beam into different diffracted output beams at different optical wavelengths in different diffracted beam directions, respectively;
an array of optical deflectors positioned relative to the optical grating to receive the different diffracted output beams at different optical wavelengths in different diffracted beam directions from each optical fiber of the linear array of optical fibers, respectively, and redirect the received different diffracted output beams at different optical wavelengths in different diffracted beam directions from each optical fiber of the linear array of optical fibers back to the optical grating, the optical polarization rotator, the collimating lens, the optical birefringent material and the fiber terminal ports of the linear array of optical fibers;
a first cylindrical lens and a second cylindrical lens located between the optical grating and the array of optical deflectors and on different sides of an optical axis of the collimating lens; and
a control device coupled to the array of optical deflectors to apply deflector control signals to the optical deflectors, respectively, so that each optical deflector is responsive to a corresponding applied control signal to direct a diffracted output beam from the optical grating in a desired direction back to the optical grating based on the corresponding applied control signal, wherein the deflector control signals are generated to effectuate desired wavelength-selective optical switching in the linear array of optical fibers.

2. The wavelength selective optical switch as in claim 1, wherein the first or the second cylindrical lens is
spaced by a focal length of the first or second cylindrical lens from each of the optical grating and the array of optical deflectors, wherein the first or second cylindrical lens is oriented to provide optical power for bending light in the second plane while exhibiting no optical power in the first plane.

3. The wavelength selective optical switch as in claim 1, wherein the first cylindrical lens is positioned to process and transmit light associated with the optical beams that transmit through the optical polarization rotator;
wherein the second cylindrical lens is positioned to process and transmit light associated with other optical beams that do not transmit through the optical polarization rotator; and
wherein each of the first and second cylindrical lenses is oriented to provide optical power for bending light in the second plane while exhibiting no optical power in the first plane.

4. The wavelength selective optical switch as in claim 1, wherein each of the first and second cylindrical lenses is positioned to process and transmit optical beams in one of the two orthogonal optical polarizations.

5. The wavelength selective optical switch as in claim 1, comprising:
a third cylindrical lens located between the optical grating and the array of optical deflectors and spaced by a focal length of the third cylindrical lens from each of the optical grating and the array of optical deflectors, wherein the third cylindrical lens is oriented to provide optical power for bending light in the second plane while exhibiting no optical power in the first plane.

6. The wavelength selective optical switch as in claim 1, comprising:
third and fourth cylindrical lenses located between the optical grating and the array of optical deflectors, wherein each of the third and fourth cylindrical lenses is oriented to provide optical power for bending light in the first plane while exhibiting no optical power in the second plane,
wherein the third cylindrical lens is located closer to the optical grating and spaced by a focal length of the third cylindrical lens from the optical grating, and the fourth cylindrical lens is located closer to the array of optical deflectors and spaced by a focal length of the fourth cylindrical lens from the array of optical deflectors, and
wherein the third and fourth cylindrical lenses are spaced from each other by a distance equal to a sum of the focal lengths of the third and fourth cylindrical lenses so that the third and fourth cylindrical lenses form a telecentric lens system between the optical grating and the array of optical deflectors.

7. The wavelength selective optical switch as in claim 1, where the array of optical deflectors includes an array of micro-electro-mechanical systems (MEMS) mirrors.

8. The wavelength selective optical switch as in claim 1, where the array of optical deflectors includes an array of liquid crystal on silicon (LCoS) cells.

9. The wavelength selective optical switch as in claim 1, further comprising a lens array of different lenses located between the linear array of optical fibers and the optical birefringent material to respectively receive light beams from the optical fibers and to control sizes of the light beams.

10. The wavelength selective optical switch as in claim 1, wherein the collimating lens is a lens system with a variable focal length.

11. The wavelength selective optical switch as in claim 1, wherein the optical grating is structured to produce the different diffracted output beams at different optical wavelengths in different diffracted beam directions by optical transmission.

12. The wavelength selective optical switch as in claim 1, wherein the optical grating is structured to produce the different diffracted output beams at different optical wavelengths in different diffracted beam directions by optical reflection.

13. The wavelength selective optical switch as in claim 1, wherein the optical birefringent material includes two pieces of birefringent crystal materials that form a Wollaston prism.

14. The wavelength selective optical switch as in claim 1, wherein the optical polarization rotator includes a half wave plate.

15. The wavelength selective optical switch as in claim 1, further comprising an optical path compensator between the optical birefringent material and the optical grating to adjust an optical path length of light associated with one of the two spatially divergent or separated optical beams in the two orthogonal optical polarizations from each optical fiber with respect to an optical path length of light associated with the other one of the two spatially divergent or separated optical beams in the two orthogonal optical polarizations from each optical fiber.

16. A wavelength selective optical switch, comprising:
a linear array of optical fibers spaced from each other along a first direction to form a first plane which has a normal direction in a second direction that is perpendicular to the first direction;
an optical birefringent material positioned to receive output light from the linear array of optical fibers and configured to spatially separate light output from each optical fiber into two spatially separated optical beams in two orthogonal optical polarizations to define a second plane which has a normal direction that is parallel to the first direction;
a collimating lens located away from the optical birefringent material to receive the spatially divergent optical beams in orthogonal optical polarizations from each optical fiber of the linear array of optical fibers and spaced from fiber terminal ports of the linear array of optical fibers by a focal length of the collimating lens to transform the two spatially divergent optical beams in the two orthogonal optical polarizations from each optical fiber into two spatially separated and parallel optical beams in the two orthogonal optical polarizations, respectively;
an optical polarization rotator positioned and structured to receive optical beams from the linear array of optical fibers in only one optical polarization of the two orthogonal optical polarizations to rotate the polarization of the received optical beams from the linear array of optical fibers in the only one optical polarization to be parallel to the other optical polarization of the two orthogonal optical polarizations so that two spatially separated and parallel optical beams from each optical fiber are in a same polarization;
an optical grating positioned downstream from the optical polarization rotator and the collimating lens to receive the two spatially separated and parallel optical beams in the same polarization from each optical fiber of the linear array of optical fibers and to diffract each optical beam into different diffracted beams at different optical wavelengths in different diffracted beam directions, respectively, wherein the optical grating is a reflective optical grating and directs the different diffracted beams at different optical wavelengths in different diffracted beam directions on a same side of the optical grating;

an array of optical deflectors positioned in optical paths of the different diffracted beams at the different optical wavelengths in the different diffracted beam directions from the optical grating to reflect the different diffracted beams back towards the optical grating so as to redirect the received different diffracted beams from the optical grating towards the collimating lens, the optical birefringent material and the fiber terminal ports of the linear array of optical fibers;

a first cylindrical lens and a second cylindrical lens located between the optical grating and the array of optical deflectors and on different sides of an optical axis of the collimating lens; and a control device coupled to the array of optical deflectors to apply deflector control signals to the optical deflectors, respectively, so that each optical deflector is responsive to a corresponding applied control signal to direct a diffracted beam from the optical grating in a desired direction towards the collimating lens, the optical birefringent material and the fiber terminal ports of the linear array of optical fibers for optical switching based on the corresponding applied control signal, wherein the deflector control signals are generated to effectuate desired wavelength-selective optical switching in the linear array of optical fibers.

17. The wavelength selective optical switch as in claim 16, wherein the first cylindrical lens is positioned to process and transmit light associated with the optical beams that transmit through the optical polarization rotator;

wherein the second cylindrical lens is positioned to process and transmit light associated with other optical beams that do not transmit through the optical polarization rotator, and wherein each of the first and second cylindrical lenses is oriented to provide optical power for bending light in the second plane while exhibiting no optical power in the first plane.

18. The wavelength selective optical switch as in claim 16, further comprising:

a lens array of different lenses located between the linear array of optical fibers and the optical birefringent material to respectively receive light beams from the optical fibers and to control sizes of the light beams.

19. The wavelength selective optical switch as in claim 16, further comprising:

a plurality of mirrors located at different locations in an optical path between the linear array of optical fibers and the optical grating to fold the optical path to reduce a footprint of the wavelength selective optical switch.

20. The wavelength selective optical switch as in claim 16, wherein each of the first and second cylindrical lenses is positioned to process and transmit optical beams in one of the two orthogonal optical polarizations.

* * * * *